United States Patent [19]
Ishimitsu et al.

[11] Patent Number: 4,519,560
[45] Date of Patent: * May 28, 1985

[54] AIRFOIL FOR CONTROLLING REFUELING BOOM

[75] Inventors: Kichio K. Ishimitsu, Mercer Island; Edward N. Tinoco, Bellevue, both of Wash.

[73] Assignee: The Boeing Company, Seattle, Wash.

[*] Notice: The portion of the term of this patent subsequent to Nov. 4, 1997 has been disclaimed.

[21] Appl. No.: 203,452

[22] Filed: Nov. 3, 1980

Related U.S. Application Data

[63] Continuation-in-part of Ser. No. 840,589, Oct. 11, 1977, Pat. No. 4,231,536.

[51] Int. Cl.³ ............................................. B64C 3/10
[52] U.S. Cl. ............................. 244/45 R; 244/35 R; 244/48; 244/130; 244/198
[58] Field of Search ............ 244/15, 36, 13, 35 R, 244/45 R, 200, 199, 198, 48, 87, 135 R, 135 A, 3.24, 3.3, 130; D12/331–344, 319

[56] References Cited

U.S. PATENT DOCUMENTS

| D. 181,858 | 1/1958 | Kartveli | D12/342 |
|---|---|---|---|
| 2,743,888 | 5/1956 | Lippisch | 244/199 |
| 3,147,938 | 9/1964 | Danner | 244/48 |
| 3,288,399 | 11/1966 | Gaster | 244/198 |
| 3,360,218 | 12/1967 | Miller | 244/200 |
| 3,942,746 | 3/1976 | Carter et al. | 244/36 |
| 4,095,761 | 6/1978 | Anderson et al. | 244/135 A |
| 4,174,083 | 11/1979 | Mohn | 244/199 |
| 4,231,536 | 11/1980 | Ishimitsu et al. | 244/135 A |
| 4,291,853 | 9/1981 | Sigalla | 244/199 |

FOREIGN PATENT DOCUMENTS

| 960053 | 3/1957 | Fed. Rep. of Germany | 244/199 |
|---|---|---|---|
| 1809593 | 9/1970 | Fed. Rep. of Germany | 244/199 |

*Primary Examiner*—Galen L. Barefoot
*Attorney, Agent, or Firm*—Hughes, Barnard & Cassidy

[57] ABSTRACT

An airfoil used in a ruddevator assembly for controlling movement of an aircraft refueling boom, where there are two airfoils (i.e. ruddevators) mounted to the boom, each at a dihedral angle of about 42°. Each airfoil has an outboard section, which is an advanced technology cambered airfoil for high lift at transonic speeds, with a raked wing tip. The inboard portion of the airfoil has a forwardly extending strake-like member having a sharp leading edge which in planform comprises three sections. There is a curved forward edge section and two rearwardly extending edge sections, which in operation are positioned at high sweep angles. The side edge portions of the strake-like member create vortices which travel over the inboard portion of the airfoil to augment lift over a wide range of surface deflection of the airfoil (i.e., angle of attack). The inboard vortex also smooths the flow over the boom housing, and another aerodynamic feature is that the hinge moments exerted on the airfoil are relatively linear over a wide range of deflection, thus enhancing the control characteristics of the ruddevator assembly.

24 Claims, 27 Drawing Figures

AIRFOIL FOR CONTROLLING REFUELING BOOM

BACKGROUND OF THE INVENTION

This is a continuation-in-part of Ser. No. 840,589 filed on Oct. 11, 1977 and now U.S. Pat. No. 4,231,536, issued Nov. 4, 1980.

A. Field of the Invention

The present invention relates generally to an airfoil configuration, the primary purpose of which is to generate greater lift over wider ranges of angle of attack and yaw angle, and more particularly to such an airfoil configuration particularly suited for use in an application such as a ruddevator assembly for an aircraft refueling boom.

B. Background of the Invention

A typical example of the requirement for an airfoil which can generate greater lift for a wide range of attack is the aircraft refueling boom. The usual method of aerial transfer of fuel from a tanker aircraft to a receiver aircraft involves the use of a refueling boom which is pivotally mounted by a gimbal device to the lower rear end of the tanker. At the outer end of the boom there is provided an aerodynamic control apparatus (i.e., a ruddevator assembly) which is controlled by an operator positioned in the aircraft at a location proximate the inner pivot end of the boom. In effect, the operator manipulates the ruddevator to "fly" the boom into position for proper rendezvous with the receiver aircraft, so that the boom outlet can be properly positioned in the inlet receptacle of the receiving aircraft. During refueling, there will be some relative movement between the two aircraft, so the operator continues to "fly" the boom during the refueling operation, so that the boom follows the receiving aircraft without transmitting boom loads to the receptacle of the receiving aircraft. The limits within which the boom is designed to be moved angularly during the refueling operation is called the "refueling envelope."

In the early 1950's, the "KC-135 Boom" was developed for the U.S. Air Force, and it used airfoil control surfaces (ruddevators), attached to the boom at 42° dihedral angle. The upper and lower surfaces of the ruddevators had symmetrical airfoil configuration, and in planform the ruddevators were rectangularly shaped. That configuration was quite satisfactory for the receiver and tanker aircraft requirements at that time.

However, with the advent of new aircraft such as the U.S. Air Force C-5A, and with jet aircraft which must be refueled at a relatively high Mach number, the earlier ruddevator configuration for the KC-135 is no longer able to generate the control forces necessary to follow the receiver aircraft to the refueling envelope extremes adequately. When refueling is accomplished at higher Mach numbers, there is greater drag and correspondingly larger forces must be exerted by the boom control surtaces to operate within the same refueling envelope. In addition, changes to current boom geometry which increase control power requirements are desirable to accommodate new aircraft. For instance, the fuel transfer rate for the larger aircraft must be greater, which in turn means a larger diameter fuel transfer tube, which in turn would create greater aerodynamic drag on the boom. Also, with larger aircraft being used, the separation of the tanker and receiver aircraft must be greater, which means longer boom length, and again, greater aerodynamic drag. Thus, there is requirement for a ruddevator system which is able to operate a refueling boom within an adequate refueling envelope under the more stringent conditions as outlined above.

With regard to the patent literature relating to refueling booms, the following patents are noted as being generally representative of the state of the art of refueling booms, as it existed in the decade between 1950 and 1960, these patents being as follows: U.S. Pat. No. 2,670,913, Castor et al; U.S. Pat. No. 2,663,523, Leisy; U.S. Pat. No. 2,960,295, Schulze; and British Patent Specification No. 765,424, filed in the name of the Boeing Airplane Company.

The following two patents are noted to show the state of the art relating to drogue type refueling devices, namely, U.S. Pat. No. 2,849,200, Person; and U.S. Pat. No. 3,048,357, Loedding.

U.S. Pat. No. 2,802,630, Birchell et al, is noted for its showing of a forwardly protruding section at the outboard end of the wing used in conjunction with a vertical fence at the outer portion of the wing. This is presumably to energize the boundary layer flow in the outboard area to improve tip stalling characteristics and thus improve stability.

U.S. Pat. No. 3,085,511, Donner, shows a plurality of stabilizing fins on the tail of a projectile, with the fins each having a forwardly protruding "tooth", to improve the stability of the fin.

U.S. Pat. No. 3,385,326, Neubeck, shows a pair of strake members positioned on the body of an aircraft at the lower rear section of the fuselage. This also is to improve stability, and it can be presumed that this would be accomplished by fixing the point of flow separation on the aft body section over a range of angles of attack, thereby minimizing the flow changes that would occur if this point of separation were allowed to change.

While not shown in any of the patents noted herein, it is also known in the prior art to mount strake-like members to the airplane fuselage at a location extending forwardly from the inboard end of the wings. Presumably, the function of such strake members is to cause flow separation at this area of the fuselage to improve aircraft performance.

The following patents are noted simply as a matter of general interest: U.S. Pat. No. 3,015,269, Potts, Jr., shows stabilizing fins at the rear section of a bomb. U.S. Pat. No. 3,438,597, Kasper, shows trailing edge control surfaces. U.S. Pat. No. 3,782,668, Womack et al, shows a ramp structure positioned forward of an aerodynamic control fin to protect the control surface pivot shaft at high supersonic speeds. U.S. Pat. No. 3,765,620, Donner et al, shows a configuration of a tapered stabilizing fin for a projectile.

SUMMARY OF THE INVENTION

The airfoil of the present invention is adapted to create high lift forces over a wide range of angles of attack. The airfoil has a spanwise axis and a chordwise axis and comprises a first section at a first spanwise location, having an airfoil configuration with a leading edge shaped to cause attached flow over the first section to create a lifting force caused by airflow over the first section. The airfoil has a second section at a second spanwise location and has an airfoil configuration to create a lifting force caused by airflow over said second section.

The second section has a forwardly extending strake-like member mounted to a forward portion of the second section. The strake-like member has a spanwise and cordwise axes generally aligned with the axes of the airfoil, and also has a leading edge comprising a first forward edge portion, a second lateral edge portion and a third lateral edge portion. The second and third lateral edge portions extend from the forward edge portion rearwardly and have a sufficiently small cross-sectional radius of curvature and a sweep angle sufficient to create vortex flow of air passing over the second and third lateral edge portions.

In the preferred configuration, the first forward edge portion of the strake-like member is in planform rounded so as to curve into tangential alignment with the second and third lateral edge portions of the strake-like member. Desirably the first and second lateral edge portions of the strake-like member diverge from each other at an angle no greater than about 90° and more desirably no greater than about 60°.

In the preferred configuration the strake-like member has a chordwise length dimension between 10% to 100% of the chordwise length dimension of the first section of the airfoil. The spanwise length dimension of the strake-like member is desirably between about 10% to 70% of the spanwise length dimension of the first and second sections of the airfoil together.

The cross-sectional radius of curvature of both the second and third lateral edge portions of the strake-like member normally should be no greater than about 0.2 inch. In the preferred form, the cross-sectional radius of curvature of the second and third lateral edge portions is no greater than about 0.1 inch.

Also in the preferred form the second section of the airfoil is located adjacent an inboard end of said airfoil and adapted to be mounted adjacent to a body member so that the strake-like member would be adjacent the body member.

In one configuration the second and third lateral edge portions slope outwardly and upwardly from a main middle portion of the strake-like member; in a second configuration the second and third lateral edge portions slope outwardly and downwardly; and in a third configuration the second and third lateral edge portions are generally parallel to a spanwise axis of said strake-like member.

Other features of the present invention will become apparent from the following detailed description.

DESCRIPTION OF THE PREFERRED EMBODIMENT

The present invention was created for the specific purpose of improving the performance capabilities of ruddevators used with aircraft refueling booms, particularly with regard to generating higher lift forces and better handling characteristics at speeds up through the transonic range within an adequately large refueling envelope. Because of the effectiveness of the present invention in solving particular problems associated with refueling booms, the preferred embodiment described herein is with reference to a ruddevator assembly used with refueling booms, and the airfoil of the present invention will be called a "ruddevator". However, it is to be understood that within the broader aspect of the present invention, this particular airfoil configuration could find worthwhile application in other situations, particularly where high lift is required at relatively large angles of attack, and where lift must be maintained under yawing conditions where the angle of the leading edge of the airfoil relative to its path of travel through an airstream is subject to variation.

Figures 1, 2:
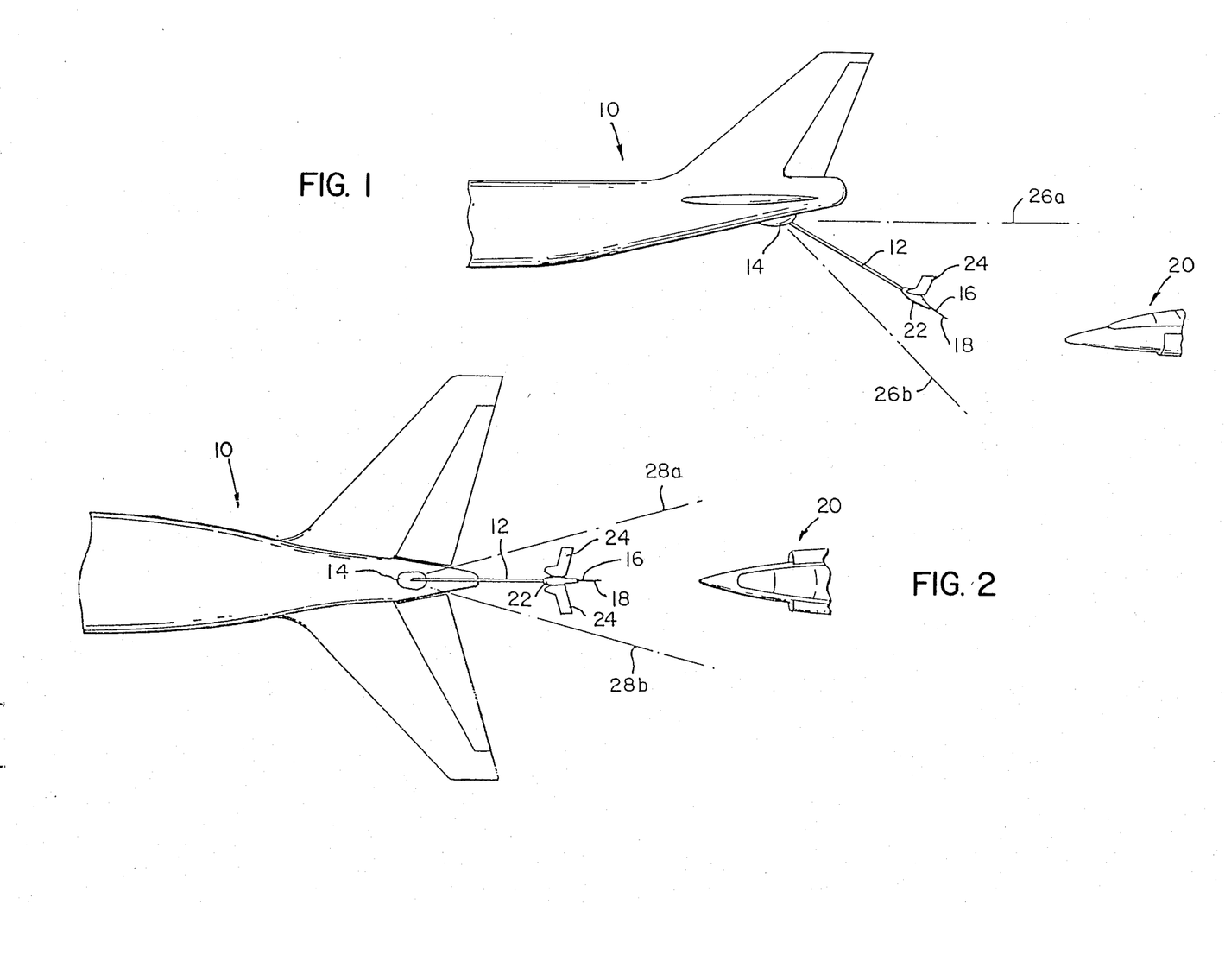
FIG. 1 is a side elevationsal view of a refueling boom incorporating the present invention in a typical refueling operation.
FIG. 2 is a bottom plan view similar to FIG. 1.

In FIGS. 1 and 2, there is shown an aircraft tanker 10, having a boom 12 gimbal mounted to the lower rear end of the aircraft at 14, and having at its outer end a refueling probe 16 mounted telescopically within the boom 12. At the outer end of the probe 16 there is a nozzle 18 which upon extension of the probe 16 becomes positioned in an intake receptacle (not shown for convenience of illustration) at the upper forward end of a receiver aircraft indicated at 20. At the outer end of the boom 12, there is an expanded housing section 22 to which the ruddevators 24 of the present invention are mounted.

In FIG. 1, the extreme vertical limits of the refueling envelope of the boom 12 are indicated at 26a and 26b with the "a" suffix indicating the upper vertical limit and the "b" suffix indicating the lower vertical limit. In FIG. 2, the right and left extreme lateral limits of the boom refueling envelope are indicated at 28a and 28b.

In a situation where refueling is accomplished at Mach numbers in the order of Mach 0.6 to Mach 0.9, within the extremes of the refueling envelope the angle which the boom 12 would make with the line of flight in its high and low positions would be between 0° and 45°. With regard to lateral deviations of the boom within the extremes of the operating envelope, the azimuth angle which the boom 12 would make with the longitudinal axis of the airplane would be about 15° or greater.

Figures 3, 4:
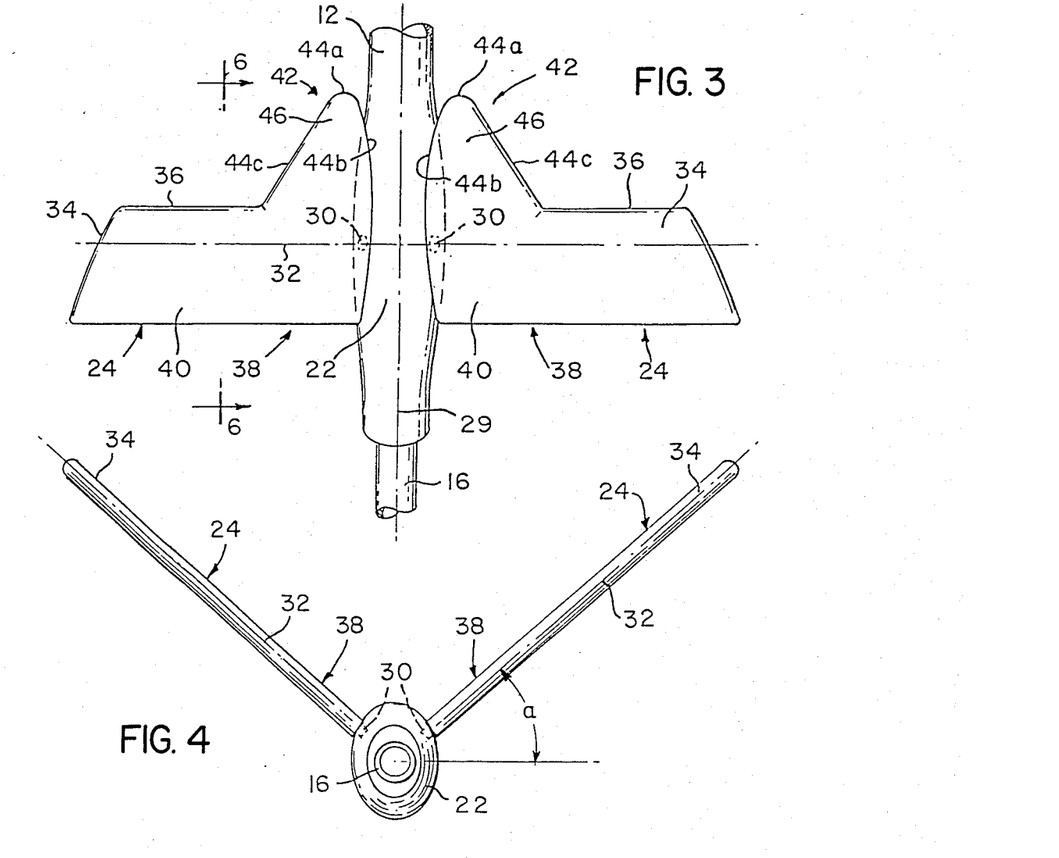
FIG. 3 is a top plan view of the ruddevator assembly utilizing the airfoil of the present invention, with the chordwise axis of each of the two airfoils being parallel with the longitudinal axis of the boom.
FIG. 4 is a rear elevational view of the ruddevator assembly of FIG. 3.
Figure 5:
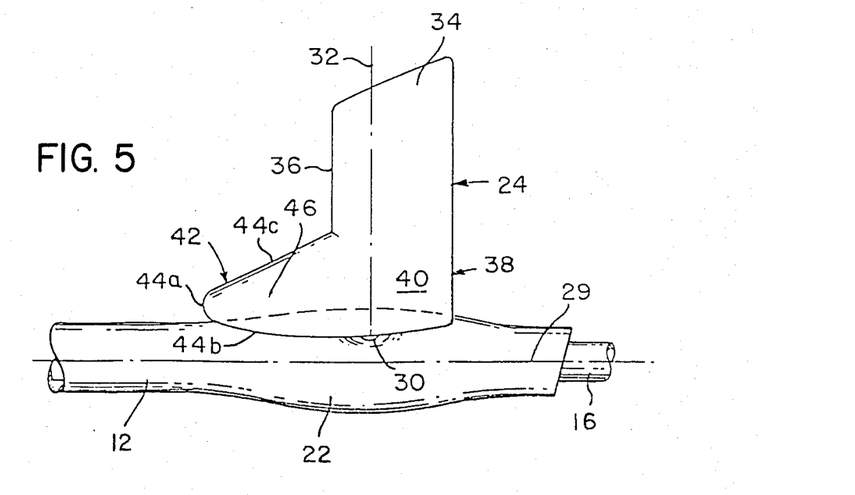
FIG. 5 is a side elevational view thereof.

To describe the basic configuration of the ruddevator assembly of the present invention, reference is made to FIGS. 3 through 5, where the two ruddevators 24 are shown positioned with the chordwise axis of each ruddevator 24 parallel to the longitudinal axis 29 of the boom 12. Each ruddevator 24 is mounted to the boom housing 22 at a dihedral angle (indicated at "a" in FIG. 4) of 42°. Each ruddevator 24 is mounted for rotation about an axis parallel to its spanwise axis by means of a respective mounting member 30 which can be rotated about its axis to change the angle attack of the ruddevator 24 relative to the longitudinal axis of the boom 12. The spanwise axis of the ruddevators and their axes of rotation are perpendicular to the longitudinal axis of the boom 12, with the axis of rotation being indicated at 32, as coinciding with the spanwise axes.

Since the two ruddevators 24 are substantially identical, except for the reversal of parts for right and left hand mounting, the following description will be confined to a single ruddevator 24.

Figure 6:
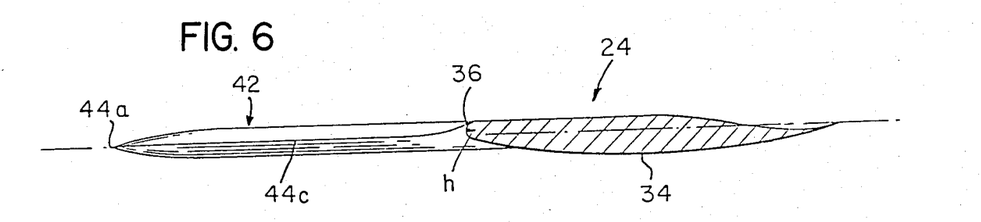
FIG. 6 is a sectional view of the right airfoil (i.e., ruddevator), taken along line 6—6 of FIG. 3.

The ruddevator 24 has an outboard section 34 which has an aerodynamic configuration with a leading edge 36 shaped to promote attached flow over the outboard ruddevator section 34. The cross-sectional configuration of this outboard section 34 is shown in FIG. 6, and it can be seen to be an advanced technology airfoil design to produce relatively high lift coefficients, such as one of the high technology airfoils which now exist in the prior art. For reasons which will be discussed more fully hereinafter, the outer edge of the airfoil section 34 is in a raked configuration (i.e., slants rearwardly and outwardly) at an angle of between about 10° to 60° from the chordwise axis of the ruddevator 24, this angle being indicated at "b" in FIG. 10, which shows the ruddevator 24 in planform.

The inboard section of each ruddevator 24 is designated 38 and comprises a rear section 40 which has a cross-sectional configuration generally similar to the outboard section 34. This inboard section 38 differs from the outboard section 34 primarily in that it has a forward strake-like portion 42. Since this strake-like portion 42 is particularly significant in the present invention, it will be described in more detail herein. The leading edge of the strake-like portion 42 is made relatively sharp (i.e., of a small leading edge radius), so as to promote detached flow of air passing over this leading edge. In planform configuration, the leading edge comprises a forward rounded edge portion 44a, a rearwardly extending inboard edge portion 44b, and a second rearwardly extending outboard edge portion 44c. The main body portion 46 of the strake-like member 42 increases in thickness from the leading portions 44a, 44b and 44c and is fared into the rear inboard section 40 to promote proper airflow over the strake-like member 42 and over the rear inboard portion 40. While the aerodynamic characteristics which the strake-like portion 42 impart to the ruddevator will be discussed more fully later herein, at this point in the description it can be stated quite briefly that the general function of the strake-like portion 42 is for the sharp leading edge portions 44b and 44c to generate vortices which travel over the ruddevator 24 to increase lift and produce other desired flow characteristics.

Before discussing further the aerodynamic characteristics which are believed to be present in the ruddevators 24 of the present invention, it is believed that it would be profitable to first discuss generally the operating characteristics of the ruddevators 24 in different positions with reference to FIGS. 7A–7C through 9A–9C. In those figures, the boom 12 with its ruddevators 24 is shown in three views in three different operating conditions.

Figures 7A, 7B:
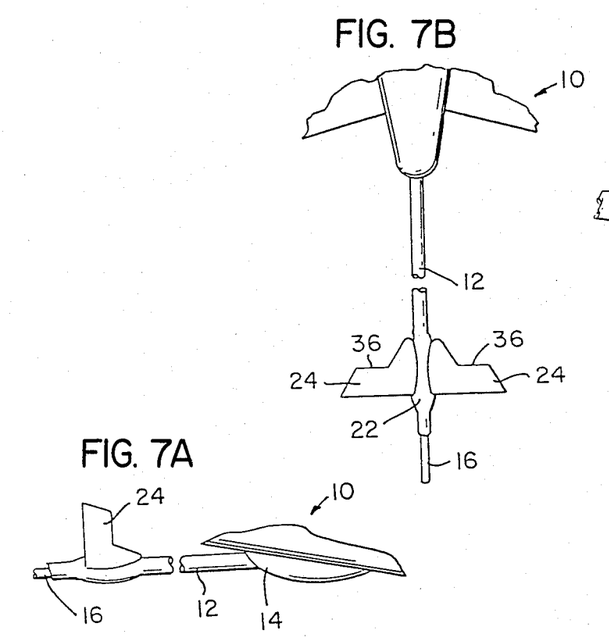
FIGS. 7A through 7C are, respectively, side, plan and rear elevational views of the refueling boom, positioned parallel to the line of flight of the airplane.
Figure 7C:
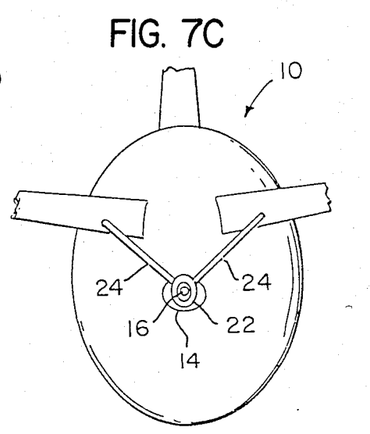

In FIGS. 7A through 7C, the boom 12 is shown extending horizontally behind the airplane 10 so as to be aligned with the longitudinal axis of the airplane 10, 7A being a side elevational view, FIG. 7B being a top plan view and 7C being a rear view.

Figures 8A, 8B:
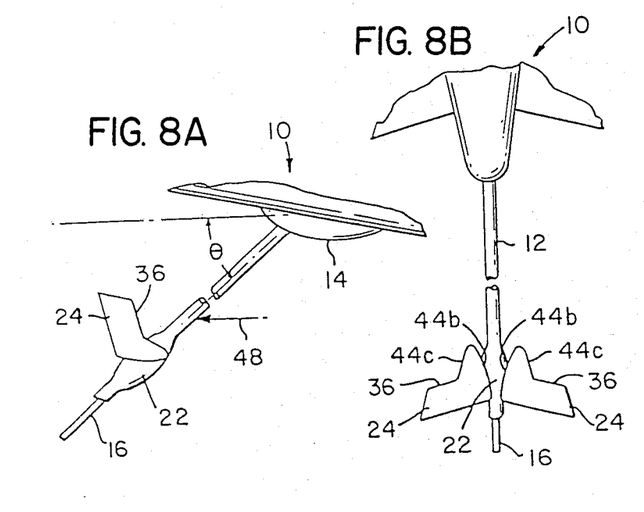
FIGS. 8A through 8C are figures similar to FIGS. 7A through 7C, showing the refueling boom positioned downwardly at an angle of 40° with the line of flight of the airplane.
Figure 8C:
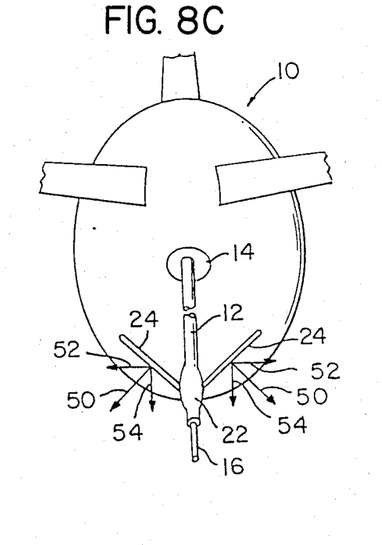

In FIGS. 8A through 8C, the boom 12 has been moved down to an angle of 40° from the horizontal, this angle being indicates as "θ" in FIG. 8A. As can be seen from the top view of FIG. 8B and the rear view of FIG. 8C, the boom 12 has not been shifted laterally, so the azimuth angle is zero. In this position, the drag force, indicated at 48 in FIG. 8A, of the air flowing against the boom 12 and the ruddevators 24 tends to swing the boom upwardly and rearwardly. Thus, to hold the boom 12 in position, the two ruddevators 24 must exert lift forces in a downward direction to counteract this drag force. (Note: As used herein, the term "lift" designates the forces generated generally perpendicular to the plane of each ruddevator 24, which have the net effect of producing a downward force on the boom 12 against the action of the drag force 48). As shown in FIG. 8C, the lift forces 50 exerted on the two ruddevators are normal to their respective ruddevator surfaces and can be broken into two oppositely directed lateral force components 52 and two downwardly directed force components 54 which are parallel to one another. The net effect in this particular situation is that the lateral forces 52 cancel each other out, and the downward forces 54 are additive and reach a level adequate to counteract the effect of the drag force 48 and hold the boom 12 in its downwardly angled position.

Figures 9A, 9B, 9C, 10:
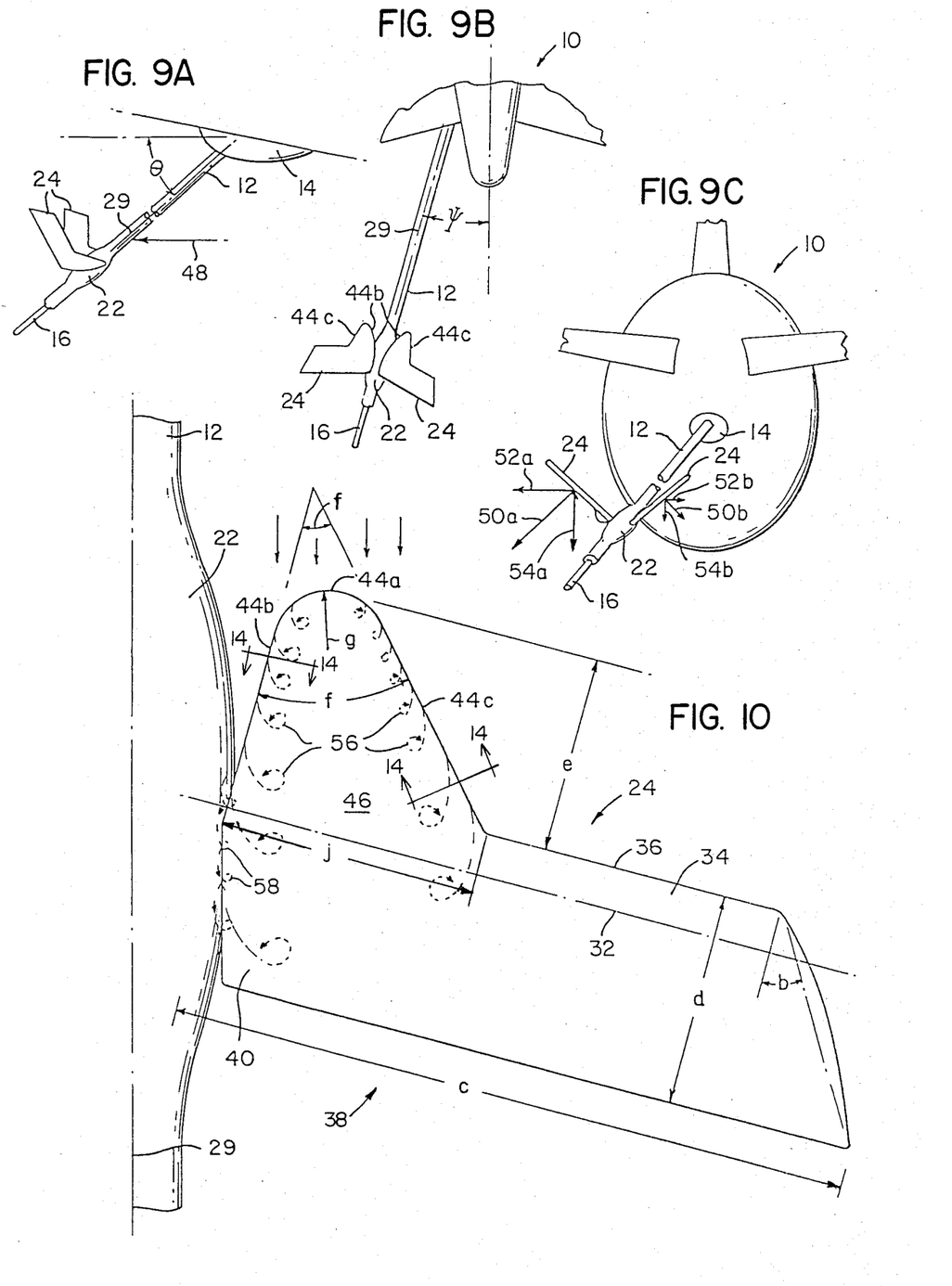
FIGS. 9A through 9C are similar to FIGS. 7A through 7C and FIGS. 8A through 8C, showing the refueling boom positioned at a vertical angle from the flight path of the airplane of 40°, and slanting laterally at an azimuth angle of 15°.
FIG. 10 is a bottom planform view of a left airfoil (i.e., ruddevator), rotated about its mounting to a position where its chordwise axis is at an angle of about 40° with a plane parallel to the longitudinal axis of the boom.

In FIGS. 9A through 9C, the boom 12 is shown operating at a more extreme condition, where not only is it deflected downwardly at an angle of θ of 40°, but it is also deflected laterally at an azimuth angle of 15°, indicated at Ψ in FIG. 9B. The forces exerted by the two ruddevators 24 to maintain the boom 12 in that position are indicated in FIG. 9C. It can be seen that the lift force generated by the left ruddevator 24 indicated at 50a, is substantially greater in magnitude than the lift force 50b generated by the right ruddevator 24. This is necessary to cause a differential in the lateral force components 52a and 52b to counteract the drag force 48 exerted against the boom and the ruddevators which force 48 tends to move the boom 12 laterally toward its center position, in addition to tending to swing the boom upwardly. As in the situation of FIGS. 8A–8C, this latter tendency is counteracted by the total force generated by the two downward components 54a and 54b, as indicated in FIG. 9C.

To explore another facet of the positioning of the boom 12 in the three different positions shown in FIGS. 7A–C through 9A–C, reference is first made to FIG. 7B, where it can be seen that with the boom positioned horizontally (i.e., parallel to the flight path), the leading edges 36 of the two outboard ruddevator sections are perpendicular to the path of the air flow. However, since the two ruddevators 24 are hinge mounted about a dihedral axis of 42°, in the position of FIGS. of 8A through 8C, where the two ruddevators 24 are rotated so that the forward ends thereof move downwardly relative to the axis of the boom 12 to assume the proper angle of attack, the outboard leading edges 36 are in a swept wing configuration. Further, the two inboard strake-like leading edge portions 44b become positioned at a forward and outward slant at a high sweep angle, and at the same time the two outboard strake-like leading portions 44c assume an angle of yet higher sweep, in comparison with the position shown in FIG. 7B.

To proceed further with this analysis, reference is now made to FIG. 9B, where in addition to the boom 12 being deflected downwardly at an angle of 40° from the horizontal, the boom 12 is also deflected laterally to an azimuth angle of 15° from the longitudinal axis. It will be recalled from the earlier examination of FIG. 9C that for the boom 12 to assume this position, the left ruddevator 24 must exert substantial lift forces. In this position, the inboard strakelike edge 44b of the left ruddevator 24 has increased its sweep angle somewhat, while the outboard strake-like edge 44c has decreased its sweep angle to the same degree. It will be noted that as the azimuth (Ψ) angle is increased or decreased by the ruddevator swinging laterally, the two strake-like edges 44b and 44c continue to have substantial exposure at a high sweep angle to continue to provide the desirable vortex flow throughout various azimuth angles. The foregoing analyses made with reference to FIGS. 7A–7C through 9A–9C are presented to illustrate the lift forces which must be generated by the ruddevators 24 in different operating positions, and also the position of the ruddevators 24 relative to the airstream.

To proceed now to an analysis of the aerodynamic effects created by the ruddevators 24 of the present invention, reference is made to FIG. 10 which is a bottom planform view of the left ruddevator, as seen in the position of FIGS. 8A–C. As indicated earlier, the leading edge portions 44a–c of the strake-like member 42 are made sufficiently sharp (i.e., of a sufficiently small radius) to cause separation of air which flows over such edge portions 44a–c. The precise degree of sharpness which is required to cause such separation will vary, depending upon a number of circumstances, but it is well within the skill of the art for an aerodynamicist to be able to design edge portions of sufficient sharpness to cause such separation. As the air flow passes by the forward edge 44a, it separates along the two lateral edges 44b and 44c, and flows rearwardly in the form of two counter-rotating vortices over the inboard ruddevator portion 38 indicated by arrows 56. With the spanline of the ruddevator 24 slanted at a moderate sweep angle with respect to the air flow, the two strake-like edges 44b and 44c are both exposed to the air flow at a rather steep sweep angle, thus enhancing the desirable vortex flow. Also, it is believed that the vortex along the inboard edge 44b sweeps the side of the boom housing 22, as indicated at 58, to improve flow in that region.

With regard to the outboard portion 34 of the ruddevator 24, the angle of the rake of the wingtip is such so as to be generally parallel with the direction of the air flow, thus enhancing air flow in the tip region and providing an added improvement to the overall lift force exerted by the ruddevator 24.

Figure 11:
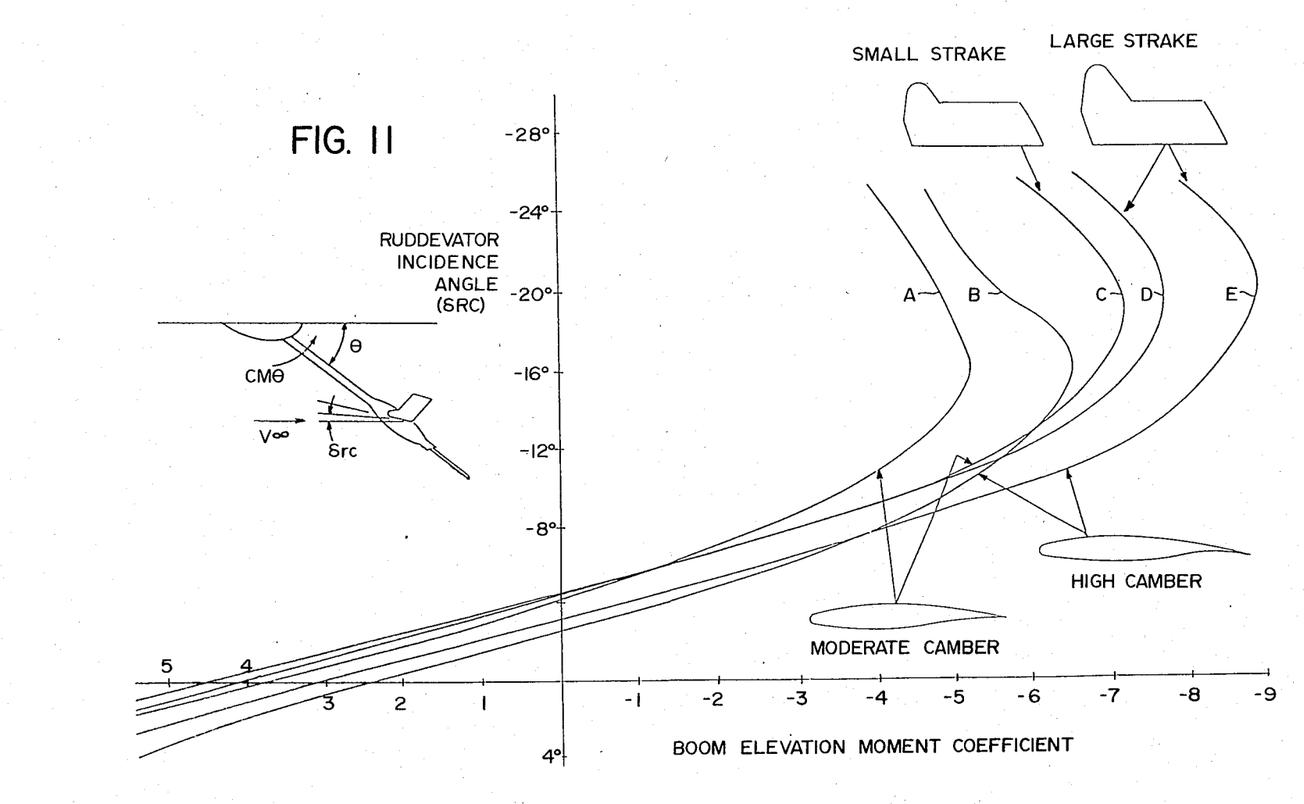
FIG. 11 is a graph illustrating the performance characteristics of five different airfoil designs, in which the net boom elevation moment coefficient was plotted against the angle of incidence of the various airfoils relative to the airstream.

To demonstrate the operating characteristics of the present invention, a model of a typical refueling boom was constructed and tested in the Boeing wind tunnel in Seattle, Wash. A series of tests were run with ruddevators of various configurations, with an air flow at various Mach numbers, azimuth angles and angles of deflection from the horizontal. The various ruddevators were mounted to the boom and operated at various angles of attack to determine the net boom elevation moment exerted by the ruddevators. The test results of five ruddevators tested are shown in the graph of FIG. 11, where the boom elevation moment coefficient is plotted against the ruddevator incidence angle, which is the angle of attack with respect to the air stream.

An advanced technology airfoil with a moderate reverse camber, having a raked tip of 30° was tested, with the results given in Curve A. This airfoil did not have the strake-like member 42. Then the same airfoil planform was again used, but with an advanced technology airfoil with a relatively high camber, and the results of this test are given in Curve B. It can be seen that somewhat improved results are obtained.

Then, three ruddevator configurations were tested, with the strake-like member 42 added to the inboard leading edge. First, in Curve C, there is shown the results of adding a relatively small strake-like member to the moderate reverse camber airfoil, such as that of Curve A. It can be seen that the performance is substantially better than the same airfoil without the strake. Then a larger strake-like member was added to the advance technology moderate reverse camber airfoil and tested, with the results given in Curve D. Finally, the larger strake-like member was added to the high camber advanced technology airfoil with the results being given in Curve E. It can be seen from an examination of Curves D and E that yet higher performance was obtained with the larger strake-like member, in that the net force on the boom continued to increase with the angle of incidence being up to as high as 20°.

From these test results, the following conclusions can be drawn:

a. with both types of advanced technology airfoils tested, the addition of the strake-like member improved performance with regard to the net force imparted to the boom, in that the ruddevators with the strake-like extension improved lift over a wider range of angles of attack, b. the addition of a larger strake-like member improved lift performance beyond what was achieved by the smaller strake-like member.

It should be noted that what was measured in these tests was the net effect of the moments exerted in the boom. Thus, these test results take into account any increased drag which might result by the addition of the strake-like members and of increased drag resulting from increasing angle of incidence, which would tend to cancel out the effects of the increased lift.

Figure 12:
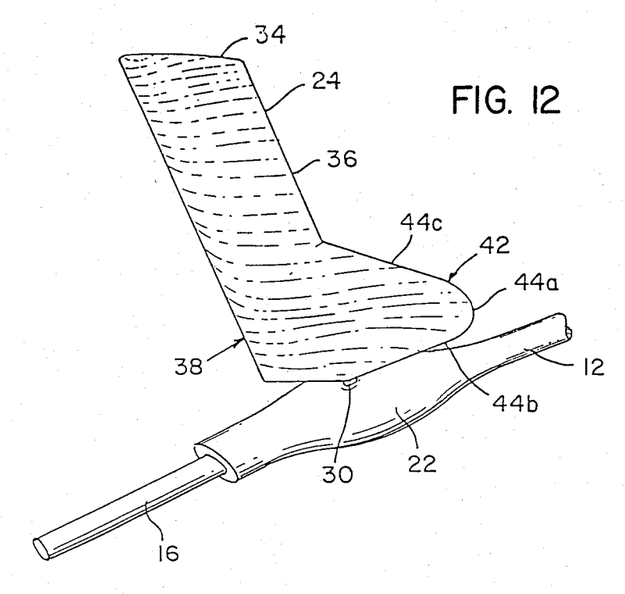
FIG. 12 is a perspective view of a wind tunnel model of the airfoil of the present invention illustrating flow characteristics of air passing over the airfoil.

To provide graphic representation of the aerodynamic effects of the ruddevator of the present invention, lampblack oil was placed upon the surfaces of a ruddevator such as that whose test results were given in Curve E of FIG. 11. The Mach number was 0.80, the θ angle (angle of deflection from the horizontal) was 40°; the azimuth angle was zero; and the angle of attack was only 1°, which was adequate to balance the drag loads on the boom. The flow lines, as indicated by the effects on the lampblack, are illustrated in FIG. 12. It can be seen that the flow remains attached and well behaved.

There is some evidence of vortex roll-up at the wing tip which should result in increased lift.

Figure 13:
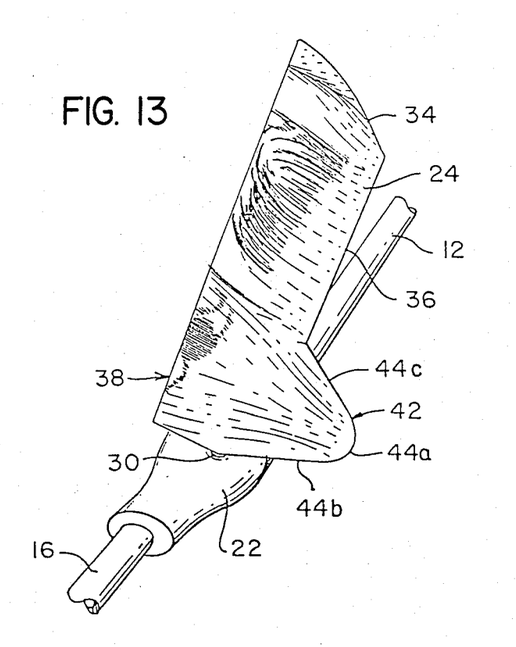
FIG. 13 is a perspective view of the same model as shown in FIG. 12, under a modified operating condition in the wind tunnel.

Reference is now made to FIG. 13 where the same ruddevator as seen in FIG. 12 was tested in the wind tunnel under the same conditions, except that the azimuth angle of the boom was shifted 15° from the center, and the angle of attack of the ruddevator which was most heavily loaded (i.e., the ruddevator on the side of the boom toward which the boom was shifted) was 8.2°. It can be seen from the patterns left in the lampblack spread on the surface of the ruddevator that the outboard portion of the ruddevator is experiencing massive flow separation. Some separation is also evident on the inboard portion between the trailing vortices from the strakes. The regions of the ruddevator beneath the vortices from the strake and the raked tip exhibit a more behaved flow without separation.

To describe more particularly the physical configuration of the ruddevator of the present invention, on the assumption that the length of the refueling boom to which the ruddevator is to be mounted is about 40 feet extended, and its refueling capability is approximately 1200 gallons per minute, a ruddevator capable of providing proper control for such a boom at flight speeds of Mach 0.80 within the extremes of the refueling envelope would be as follows. The span of the ruddevator (shown at "c" in FIG. 10) would be 8.5 feet, the chord length of the outboard section 34 (indicated at "d" in FIG. 10) would be 2.5 feet. The length of the forward extension of the strake-like member 42 (indicated at "e" in FIG. 10) would be 2.3 feet. The angle between the two strake-like lateral edge portions 44b and 44c (indicated at "f" in FIG. 10) would be 41°. The radius of curvature of the forward strake-like edge portion 42a in plan view (indicated at "g" in FIG. 10) would be about 8 inches. The radius of cross-sectional curvature of the leading edge 36 of the outboard ruddevator portion 34 (indicated at "h" in FIG. 6) would be about 1½ to 2 inches. The radius of cross-sectional curvature of the strake-like leading edge portions 44a–c would be about 0.05 to 0.1 inch.

With regard to the angle "f" made between the two strake-like lateral leading edge portions 42b and 42c, this angle will vary depending upon the particular design requirements. For example, if the yaw angle over which the ruddevator 24 operates varies within a wider range, it can be expected that the angle "f" would be increased to give both lateral strake-like edge portions 44b and 44c adequate exposure to the air stream over a greater range of yaw angles. On the other hand, if the airfoil which forms the ruddevator 24 is used in an application where the yaw angle is expected to be of a substantially lesser magnitude, the angle "f" could be placed within closer limits to optimize the aerodynamic effect of the vortexes created. In general, within the operating conditions of a refueling boom such as shown herein, it can be expected that the angle "f" would be as great as possible 90° and as small as possibly 20°, and desirably between about 35° to 60°.

With regard to the rake angle "b" of the outboard portion of the ruddevator, this angle would be between about 15° to 45° and desirably about 30° in the particular arrangement shown herein.

With regard to the configuration of the airfoil of the present invention in general, whether or not applied to a aircraft refueling boom, the following design parameter are believed to be applicable. First, the chordwise length of the strake-like member 42 (indicated at "e" in FIG. 10) would be at a minimum 10% of, and as a maximum 100% of, the cord length (indicated at "d" in FIG. 10) of the airfoil section 34 that is not directly rearwardly of the strake-like member 42. The angle between the two lateral leading edge portions 44b and 44c (indicated at "f" in FIG. 10) would be between 0° to 90°. Each of the leading edge portions 44b and 44c would be positioned at an angle with the oncoming air-stream no greater than approximately 45°, and as a minimum this angle would approach 0°. The spanwise dimension of the strake-like member 42 (indicated at "j" in FIG. 10) would be between 10% to 70% of the total spanwise dimension of the airfoil (indicated at "c" in FIG. 10).

The sharpness of the lateral leading edge portions (i.e. 44b and 44c) is quite critical. These leading edge portions 44b and 44c should be sufficiently sharp to insure that there is a controlled and predictable separation of the airflow over these leading edge portions 44b and 44c. Specifically, the radius of curvature, of each leading edge portion 44b and 44c (and desirably of edge portion 44a) in cross-sectional configuration (i.e. perpendicular to the length of the leading edge 44b or 44c) should be between 0.001 to 0.2 inches, and desirably no greater than 0.1 inch. Furthermore, for the more common applications, this degree of sharpness should be sufficient to cause controlled separation at relatively small angles of attach (e.g. as low as 1° angle attack).

The precise configuration of the leading edge portions 44b and 44c can be arranged more precisely to achieve specific results. These various configurations are illustrated in FIGS. 14a thru 14h, which show the cross-sectional configuration at a typical leading edge location, indicated at 14—14 in FIG. 10. It should be understood that in each of the FIGS. 14a thru 14h, the direction of lift is shown as being in an upward direction, instead of the downward direction as decribed previously with regard to the application of the present invention in a ruddevator.

Figure 14A:
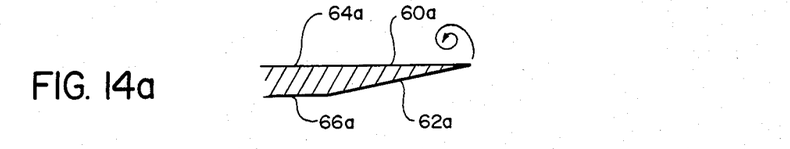
FIGS. 14a thru 14h are sectional views taken at the locations indicated at 14—14 of FIG. 10, illustrating modified leading edge configurations for the strake-like member of the present invention.

In FIG. 14a, the upper and lower strake surface portions 60a and 62a, respectively, that are immediately adjacent the leading edge are made substantially flat so that the leading edge has a generally wedge shaped configuration. The upper surface portion 60a is substantially parallel to the main upper strake surface 64a, while the lower leading edge surface portion 62a slants upwardly relative to the lower surface 66a of the main portion of the strake-like member. This configuration promotes detached airflow over the upper strake surfaces 60a and 64a at very low angles of attack. This configuration is desirable where greater lift is desired for such low angles of attack.

Figure 14B:
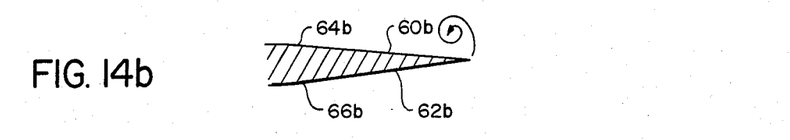

FIG. 14b shows a configuration where the upper and lower leading edge surface portions 60b and 62b are formed as a symmetrical wedge in cross-section, relative to the upper and lower main strake surfaces 64b and 66b. This configuration would be more desirable where relatively large lift should be developed in both an upward and a downward direction. This sort of airfoil having a strake-like member with the configuration of 14b would be desirable, for example, in an airfoil used as a control surface for a missile where relatively large upward and downward lift components would be desirable.

Figure 14C:
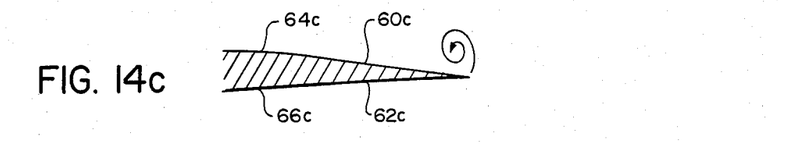

FIG. 14c shows another form, where the lower leading edge surface portion 62c, is substantially parallel to the lower surface 66c of the main portion of the strake-like member, while the upper surface portion 60c slants downwardly toward the leading edge from the upper surface 64c of the main portion of the strake-like member. With this configuration, it is still possible to develop increased lift. However, in cruise configuration where the airfoil is substantially level, there is somewhat less drag than in the configurations of FIGS. 14a and 14b.

Figure 14D:
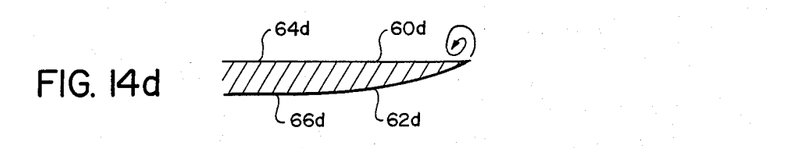

In FIG. 14d, there is shown a leading edge configuration for the strake-like member quite similar to that shown in FIG. 14a. The upper surface 60d that is adjacent the leading edge portion is substantially parallel to the main strake upper surface portion 64d. The bottom surface portion 64d adjacent the leading edge slants in a convex curve upwardly toward the leading edge. This configuration would be used in the same circumstances as the configuration of FIG. 14a.

Figure 14E:
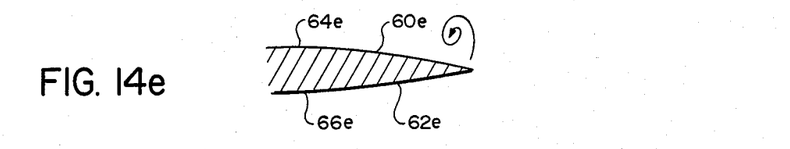

In FIG. 14e, there is shown a symmetrical configuration, similar to FIG. 14b, but the two leading edge surfaces 60e and 62e are made convex instead of flat. Such a configuration would be used in generally the same applications as the configuration of FIG. 14b.

Figure 14F:
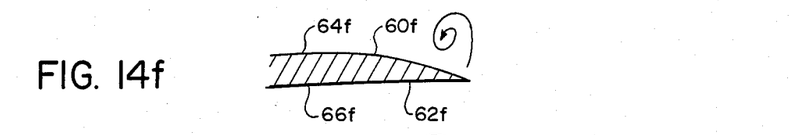

FIG. 14f shows a configuration similar to FIG. 14c, and the lower leading edge surface 62f is substantially parallel to the lower surface portion 66f of the strake-like member. The upper leading edge surface portion 60f slopes in a curve downwardly toward the leading edge. The application for this configuration of FIG. 14f would be for generally the same purposes as with the configuration of FIG. 14c.

Figure 14G:
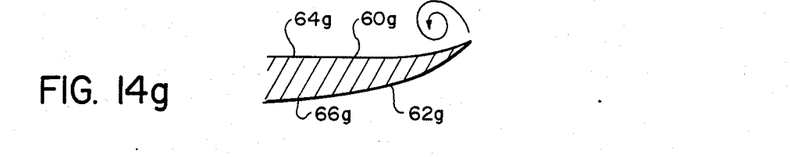

FIG. 14g shows a configuration very similar to that of FIG. 14d, except that the outer portion of the upper leading edge surface 60g actually curves upwardly at the outermost portion immediately adjacent to the leading edge. This configuration develops a rather strong vortex for relatively high lift, and the applications would be generally the same as those indicated for FIG. 14a.

Figure 14H:
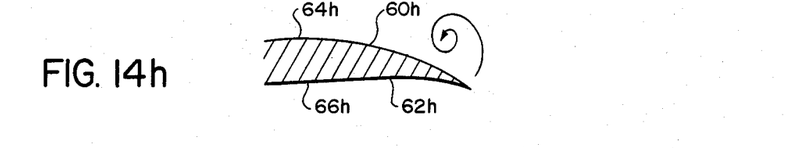

Finally, in 14h, there is shown a configuration similar to FIG. 14f. However, the lower surface portion 62h that is immediately adjacent the leading edge actually curves downwardly to meet the leading edge. This arrangement develops relatively less drag when the airfoil with the strake-like member is in cruise mode with zero angle of attack or nearly zero angle of attack.

What is claimed is:

1. An airfoil assembly, comprising:
   a. a body member,
   b. a pair of airfoils on opposite sides of said body member, each airfoil having a spanwise axis and a chordwise axis, each airfoil comprising:
      1. a first section at a first outboard spanwise location, having an airfoil configuration with a leading edge shaped to cause attached flow over said first section to create a lifting force caused by airflow over said first section;
      2. a second section at a second inboard spanwise location, having an airfoil configuration to create a lifting force caused by airflow over said second section;
      3. said second section having a forwardly extending strake-like member mounted to a forward portion of the second section at a location proximate said body, and having spanwise and chordwise axes generally aligned with the axes of the airfoil;
      4. said strake-like member having a leading edge comprising:
         (i) a first forward edge portion;
         (ii) a second lateral edge portion extending from the forward edge portion to the leading edge of the first section, said second lateral edge portion having a sufficiently small cross-sectional radius of curvature and having a sweep angle sufficient to create a single discrete vortex of air passing over said second lateral edge portion, through a range from a very low angle of attack to a very high angle of attack;
         (iii) a third lateral edge portion extending rearwardly from the first forward edge portion proximate said body member, said third lateral edge portion having a sufficiently small cross-sectional radius of curvature and having a sweep angle sufficient to create a single discrete vortex of air passing adjacent said body member and over said third lateral edge portion, through a range from a very low angle of attack to a very high angle of attack.

2. The airfoil assembly as recited in claim 1, wherein the first forward edge portion of each strake-like member is in planform rounded so as to curve into tangential alignment with the second and third lateral edge portions of each strake-like member.

3. The airfoil assembly as recited in claim 1, wherein said first and second lateral edge portions of each strake-like member diverge from each other at an angle no greater than about 90°.

4. The airfoil assembly as recited in claim 2, wherein said first and second lateral edge portions of each strake-like member diverge from each other at an angle no greater than about 60°.

5. The airfoil assembly as recited in claim 1, wherein the strake-like member and the first section of each airfoil each have a chordwise length dimension, the chordwise length dimension of the strake-like member being between 10% to 100% of the chordwise length dimension of the first section of its related airfoil.

6. The airfoil assembly as recited in claim 1 wherein each strake-like member has a spanwise length dimension and the first and second sections of the related airfoil collectively have a spanwise length dimension, the spanwise length dimension of each strake-like member being between 10% to 70% of the spanwise length dimension of the first and second sections of its related airfoil.

7. The airfoil assembly as recited in claim 1, wherein the ratio of the cross-sectional radius of curvature of both the second and third lateral edge portions of each strake-like member relative to a chord length of that strake-like member is no greater than about 0.2 to 27.

8. The airfoil assembly as recited in claim 7, wherein the ratio of the cross-sectional radius of curvature of the second and third lateral edge portions to the chord length of each strake-like member is no greater than about 0.1 to 27.

9. The airfoil as recited in claim 1, wherein:
   a. the strake-like member and the first section of each airfoil each have a chordwise length dimension, the chordwise length dimension of each strake-like member being between 10% to 100% of the chordwise length dimension of the first section of its related airfoil;
   b. each strake-like member has a spanwise length dimension and the first and second sections of each airfoil collectively have a spanwise length dimension, the spanwise length dimension of each strake-like member being between 10% to 70% of the spanwise length dimension of the first and second sections of its related airfoil;

c. the ratio of the cross-sectional radius of curvature of both the second and third lateral edge portions of each strake-like member relative to a chord length of that strake-like member is no greater than about 0.2 to 27.

10. The airfoil assembly as recited in claim 1, wherein said second and third lateral edge portions of each strake-like member slope outwardly and upwardly from a main middle portion of that strake-like member.

11. The airfoil assembly as recited in claim 1, wherein said second and third lateral edge portions of each strake-like member slope outwardly and downwardly from a main middle portion of the strake-like member.

12. The airfoil assembly as recited in claim 1, wherein said second and third lateral edge portions of each strake-like member slope outwardly from a main middle portion of that strake-like member generally parallel with a spanwise axis of said strake-like member.

13. The airfoil assembly as recited in claim 1, wherein each airfoil is mounted to said body member for rotation about an axis having a substantial alignment component parallel to the spanwise axis of that airfoil.

14. The airfoil assembly as recited in claim 13, wherein the first forward edge portion of each strake-like member is in planform rounded so as to curve into tangential alignment with the second and third lateral edge portions of each strake-like member.

15. The airfoil assembly as recited in claim 13, wherein said first and second lateral edge portions of each strake-like member diverge from each other at an angle no greater than about 90°.

16. The airfoil assembly as recited in claim 13, wherein said first and second lateral edge portions of each strake-like member diverge from each other at an angle no greater than about 60°.

17. The airfoil as recited in claim 13, wherein the strake-like member and the first section of each airfoil each have a chordwise length dimension, the chordwise length dimension of the strake-like member being between 10% to 100% of the chordwise length dimension of the first section of its related airfoil.

18. The airfoil assembly as recited in claim 13, wherein each strake-like member has a spanwise length dimension and the first and second sections of the related airfoil collectively have a spanwise length dimension, the spanwise length dimension of each strake-like member being between 10% to 70% of the spanwise length dimension of the first and second sections of its related airfoil.

19. The airfoil assembly as recited in claim 13, wherein the ratio of the cross-sectional radius of curvature of both the second and third lateral edge portions of each strake-like member relative to a chord length of that strake-like member is no greater than about 0.2 to 27.

20. The airfoil assembly as recited in claim 13, wherein the ratio of the cross-sectional radius of curvature of the second and third lateral edge portions to the chord length of each strake-like member is no greater than about 0.1 to 27.

21. The airfoil as recited in claim 13, wherein:

a. the strake-like member and the first section of each airfoil each hve a chordwise length dimension, the chordwise length dimension of each strake-like member being between 10% to 100% of the chordwise length dimension of the first section of its related airfoil;

b. each strake-like member has a spanwise length dimension and the first and second sections of each airfoil collectively have a spanwise length dimension, the spanwise length dimension of each strake-like member being between 10% to 70% of the spanwise length dimension of the first and second sections of its related airfoil;

c. the ratio of the cross-sectional radius of curvature of both the second and third lateral edge portions of each strake-like member relative to a chord length of that strake-like member is no greater than about 0.2 to 27.

22. The airfoil assembly as recited in claim 13, wherein said second and third lateral edge portions of each strake-like member slope outwardly and upwardly from a main middle portion of that strake-like member.

23. The airfoil assembly as recited in claim 13, wherein said second and third lateral edge portions of each strake-like member slope outwardly and downwardly from a main middle portion of that strake-like member.

24. The airfoil assembly as recited in claim 13, wherein said second and third lateral edge portions of each strake-like member slope outwardly from a main middle portion of that strake-like member generally parallel with a spanwise axis of said strake-like member.

* * * * *